United States Patent Office 3,605,823
Patented Sept. 20, 1971

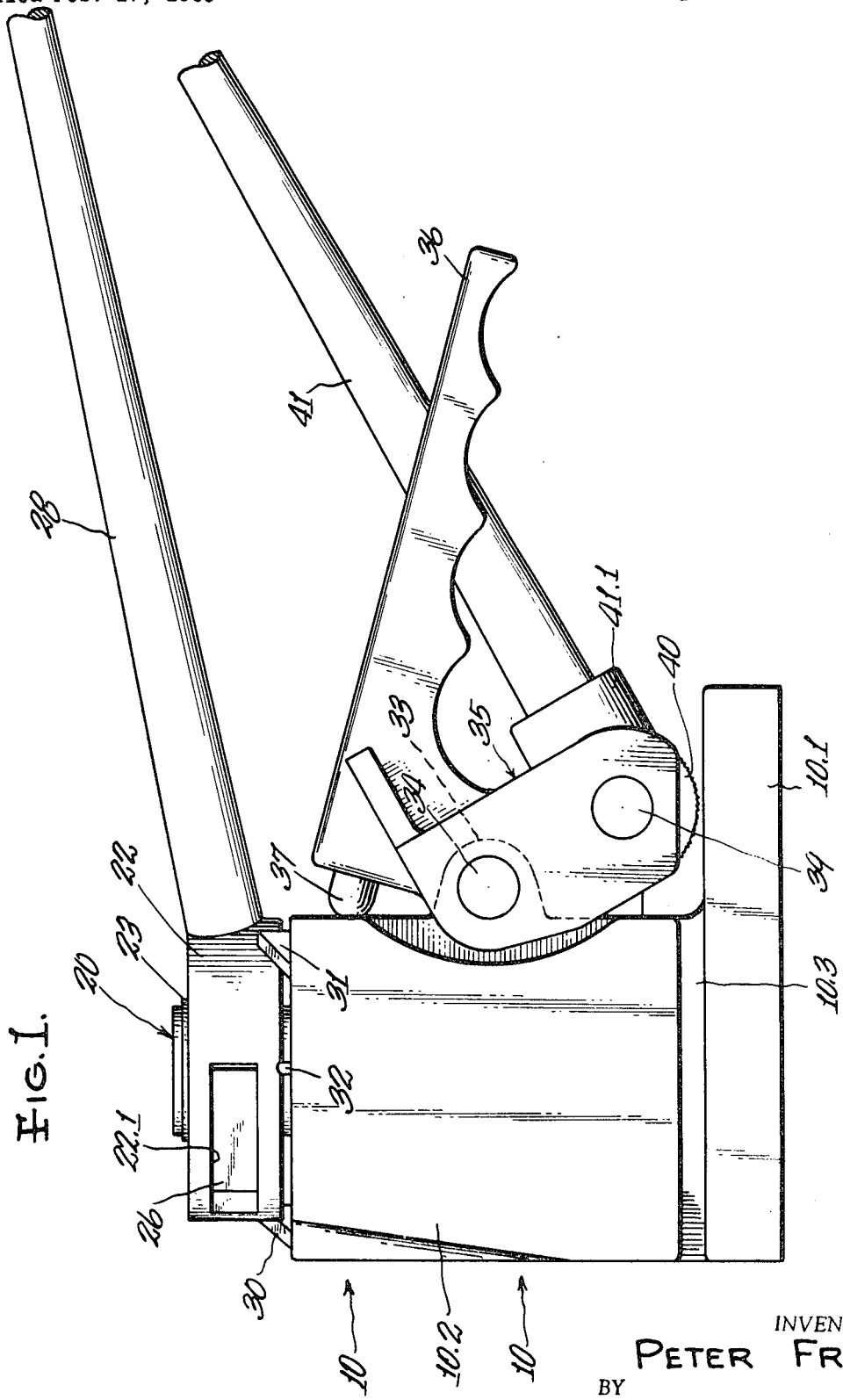

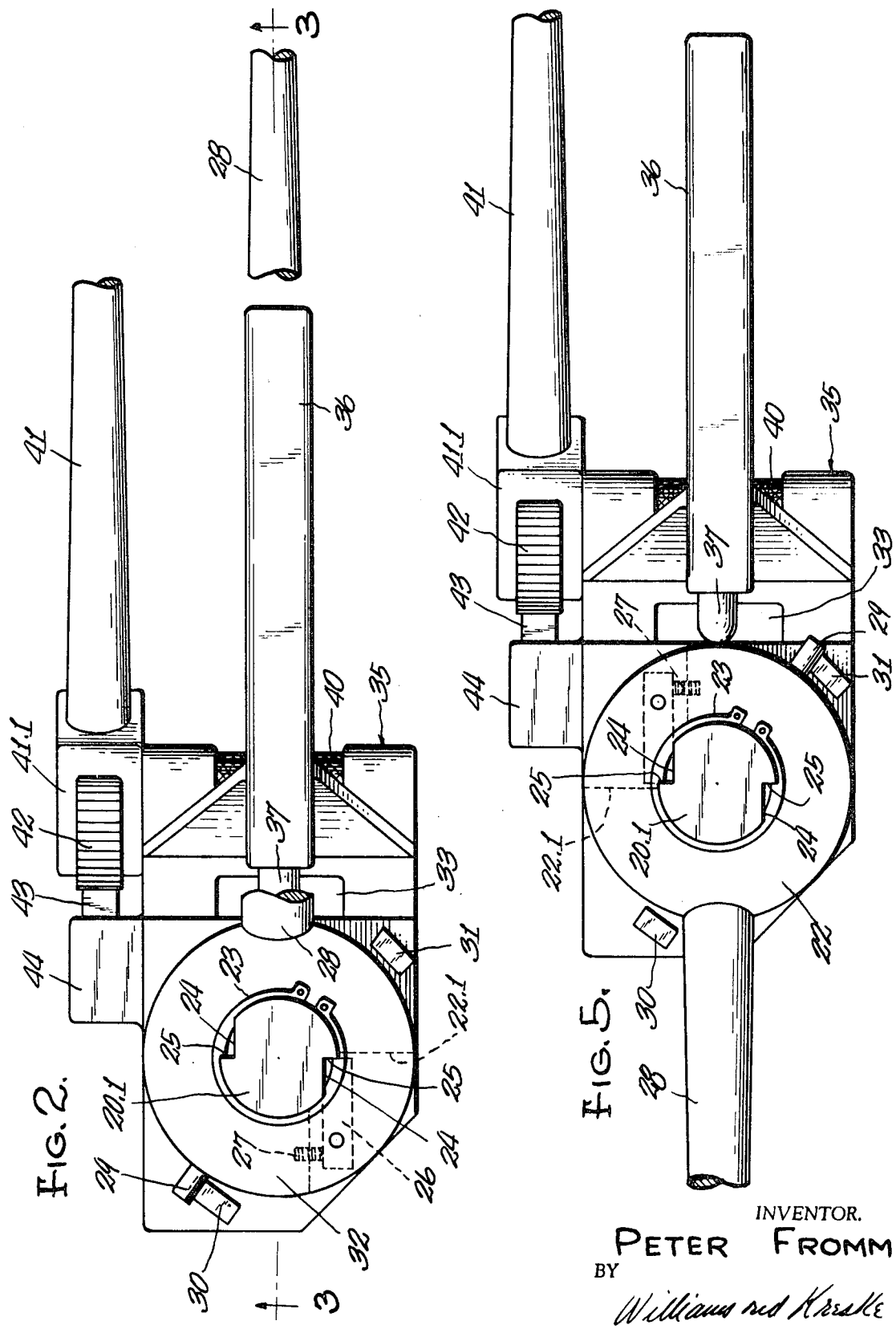

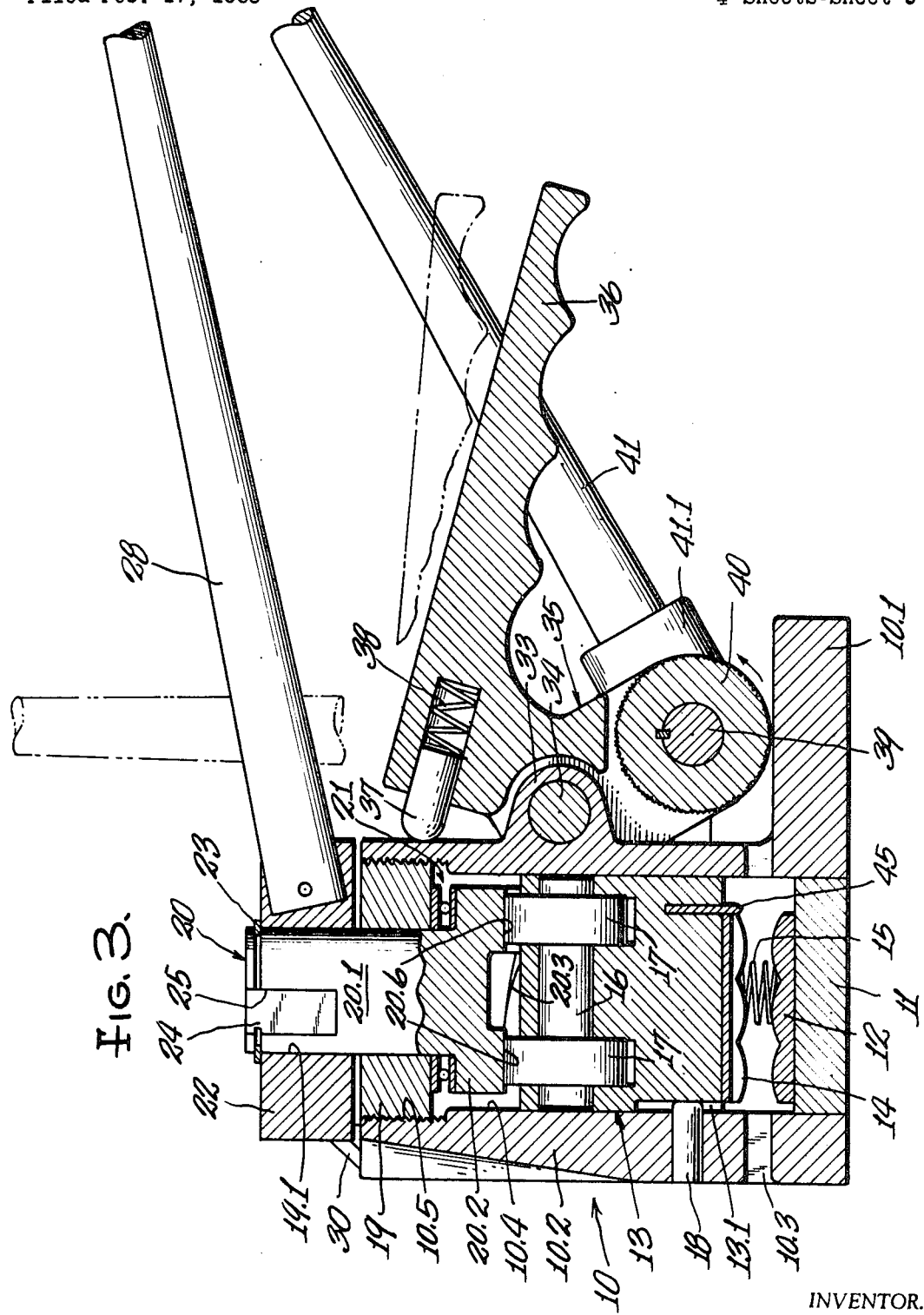

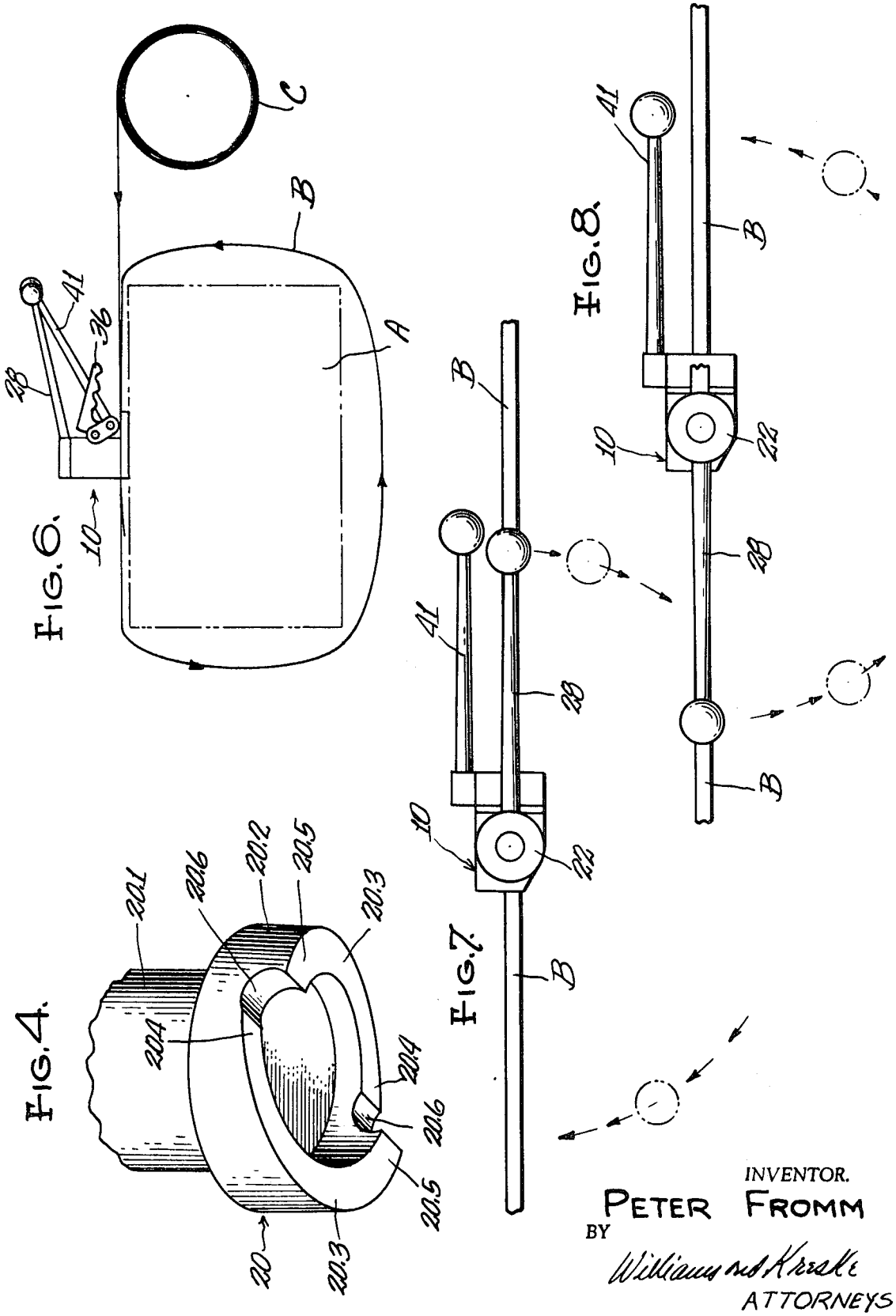

3,605,823
BANDING APPARATUS
Peter Fromm, Zurich, Switzerland, assignor to
A. Fromm G.m.b.H., Zurich, Switzerland
Filed Feb. 17, 1969, Ser. No. 799,782
Int. Cl. B21f 9/02; B25b
U.S. Cl. 140—93.2
6 Claims

ABSTRACT OF THE DISCLOSURE

A tool for fastening together overlapped band portions and providing upper and lower die members for receiving such band portions therebetween. The upper die member is vertically movable toward the lower die member to form tongues in respective band portions which interlock with each other, such movement of the upper die member being effected by an actuating member rotatable about a vertical axis and having a helical cam surface for effecting such die member movement.

SUMMARY OF THE INVENTION

While tools for tensioning a band about an object and for fastening overlapped band portions together by forming interlocking portions therein have long been known, one example being Letters Patent 2,040,576, issued in 1936 to Timmerbeil, all of such prior art tools have been cumbersome to operate and have been relatively large, heavy and complex. In contrast, the present invention provides a simple, light-weight, compact tool of the type disclosed which is exceedingly easy to operate. The foregoing is accomplished by providing an operating member which is rotatable about an axis extending in the same direction as the direction of die member movement. Such operating member is provided with diametrically opposed, cam-like surfaces engageable with rollers mounted on a slide which carries the movable die member. The arrangement of the cam surfaces on the operating member is such that approximately 180 degrees rotation of such member effects movement of the slide and the die member carried thereon through an operational cycle.

The advantages hereinabove mentioned as well as other advantages will readily become apparent from a study of the following description and from the drawings appended hereto, and in these drawings:

DRAWING DESCRIPTION

FIG. 1 is a fragmentary, side elevational view of a tool embodying the present invention, FIG. 2 is a fragmentary, top plan view of the tool seen in FIG. 1, a part on the near side being broken away to show the underlying structure, FIG. 3 is a fragmentary sectional view generally corresponding to the line 3—3 of FIG. 2, FIG. 4 is a fragmentary perspective view of a detail, FIG. 5 is a view similar to FIG. 2, but showing certain parts in another position, FIG. 6 is a greatly reduced side elevational view, similar to FIG. 1, but illustrating use of the tool in banding an article, and FIGS. 7 and 8 are slightly reduced plan views, similar to FIGS. 2 and 5 respectively, but illustrating the manner of use.

DETAILED DESCRIPTION

With reference to FIGS. 1, 2 and 3, the present tool comprises a housing 10 formed of a base 10.1 and an integral, upstanding portion 10.2 positioned at the left, in the position of parts shown, end of the base portion. For a purpose to appear, the housing is horizontally slotted at 10.3 on the near side in the plane of the upper surface of the housing base 10.1; however, such slot extends but little more than halfway from the housing near side toward the housing far side, thus leaving sufficient supporting material joining the housing portions 10.1, 10.2.

Housing portion 10.2, as seen in FIG. 3, provides an upstanding bore 10.4 whose upper portion is radially enlarged and internally threaded at 10.5. Suitably anchored by any convenient means in the lower portion of housing bore 10.4; that is, in the housing base portion 10.1, is a plug 11 on whose upper face is mounted a lower die member 12 whose function will later appear.

Slidable within housing bore 10.4 is a plunger, or slide 13, on whose lower face is mounted an upper die member 14 adapted for cooperation with the lower die member 12. A compression spring 15 is interposed between the plug 11 and the slide 13 and biases the latter upwardly to yieldably retain the upper die spaced above the lower die as herein illustrated. Extending transversely of the slide 13 is a shaft 16 on which are rotatably mounted rollers 17, 17. Rollers 17 are closely received within respective slots formed in the slide 13 and such rollers project above the upper portion of such slide for reasons to appear. The arrangement of rollers 17, 17 is such that they are in diametrically opposed relation relative to the axis of the slide 13. Means are provided for preventing rotational movement of slide 13 and as herein disclosed, a pin 18 is anchored in the housing portion 10.2 and projects slightly into the housing bore 10.4 and closely but slidably fits within an axially extending groove 13.1 formed in the adjoining periphery of slide 13.

Threadably engaged with the threaded bore portion 10.5 is a cap 19 having a central aperture 19.1 and, rotatably fitting within aperture 19.1 is the shank portion 20.1 of a cam member 20 having a radially enlarged head 20.2 which underlies the cap. Cam shank portion 20.1 is elongated to project well above the cap 19 for reasons to appear and interposed between cam member head 20.2 and cap 19 is a thrust bearing 21.

Turning now to FIG. 4 wherein cam 20 is fragmentarily shown in enlarged and somewhat distorted form to better illustrate its construction, it will be noted that the lower face of the cam member 20 is provided with a pair of downwardly facing, arcuate cam surfaces 20.3 for engagement with respective slide rollers 17, 17. Cam surfaces 20.3 are fragmentarily helices and corresponding portions of respective cam surfaces are, it will be evident, in diametrically opposed relation with the "low" point 20.4 of each cam surface adjacent the "high" point 20.5 of the opposite cam surface. Separating adjoining cam surface portions 20.4, 20.5 are recesses 20.6 proportioned to closely receive a portion of the periphery of the previously described, respective slide rollers 17.

From the foregoing, it will be evident that as cam member 20 is rotated in a counter-clockwise direction (as viewed in FIGS. 2 and 4) from the position seen in FIG. 3 wherein the rollers 17 are seated in respective cam recesses 20.6, cam surfaces 20.3, in engagement with respective rollers 17, will force slide 13 downwardly against spring 15 until such time (after 180 degrees rotation) that recesses 20.6 once again align with respective rollers 17 to allow spring 15 to return the slide 13 to the position seen in FIG. 3.

Means are provided for effecting rotation of cam member 20 and, as seen in FIGS. 1, 2 and 3, an actuator collar 22 is rotatably secured to the projecting cam shank portion 20.1 and is retained by a snap ring 23. Opposed notches 24 are formed in the shank portion 20.1 to provide ratchet teeth 25 (see FIGS. 2 and 3) and, pivotally mounted in an opening 22.1 in the collar is a dog 26 urged by a spring 27 to engagement with respective ratchet teeth 25. A handle 28 extends radially outwardly of collar 22 for effecting rotation thereof and also projecting radially of the collar is a pin 29 which rotates with the collar between upstanding abutments 30, 31 on the housing portion 10.2 for limiting collar rotation. As seen in FIG. 1, a spring loaded plunger 32 is carried by the housing portion 10.2 beneath the collar 22 and engages in a recess in the lower face thereof to yieldably retain the collar in the position of FIGS. 1, 2, and 3.

Projecting laterally of the housing portion 10.2 is an ear 33 mounting a shaft 34 on which the upper end of a link 35 is pivoted. Formed integrally with the link 35 is a handle 36 and a plunger 37, backed by a compression spring 38 (FIG. 3) yieldably retains link 35 in the position of parts illustrated. The lower end of link 35 rotatably carries a shaft 39 on which is affixed a knurled wheel 40 for a purpose to appear.

Rotatably mounted on a rearward extension of shaft 39 is the bifurcated end 41.1 of a handle 41. Between the furcations of handle end 41.1 is a ratchet wheel 42 which is constrained to rotation with the shaft 39 and the knurled wheel 40. A spring loaded dog 43 is carried by a boss 44 on the housing 10 (FIG. 2) and such dog engages ratchet wheel 42 to prevent clockwise rotation thereof in the position of parts seen in FIGS. 1 and 2. Although not shown, a dog similar to 43 will be carried by handle portion 41.1 in engagement with ratchet wheel 42 to compel rotation of the ratchet wheel (along with shaft 39 and knurled wheel 40) when handle 41 is shifted from its full line position of FIG. 3 to the phantom line position shown and to provide for free rotation of such handle in the opposite direction.

OPERATION

With the parts positioned as seen in FIGS. 1, 2 and 3, the tool will be positioned on top of an article A to be banded (see FIG. 6) and a portion of band B will be withdrawn from a coil C and looped about the article as shown with the leading end of the band underlying an intermediate portion thereof and with the overlapped band portions disposed within the base slot 10.3. To provide for disposition of the band portions in the band slot, handle 36 will be elevated to its phantom line position of FIG. 3 thus elevating the knurled wheel 40 from the upper surface of the underlying base 10.1 to permit the overlapped band portions to be disposed therebetween. Upon release of the handle 36, the spring loaded plunger 37 will lower the knurled wheel 40 onto the band portions.

With the band thus disposed in the housing slot and being gripped by the knurled wheel, handle 41 will be reciprocated between the full and phantom line positions of FIG. 3 to rotate the knurled wheel in the counter-clockwise direction indicated, thus shifting the uppermost band portion to the right and thereby tensioning the band about the article A.

When the band has been sufficiently tensioned, handle 28 will be rotated from the position seen in FIGS. 2 and 7 to the position seen in FIGS. 5 and 8. In shifting handle 28 to the position last-mentioned, cam member 20 will remain in the position seen in FIGS. 2 and 3 since in this clockwise rotation of collar 22, dog 26 merely rides upon the periphery of the cam member shank portion 20.1. Upon reaching the position of FIGS. 5 and 8, further clockwise rotation of the handle will be prevented by engagement of the pin 29 with the abutment 31 (FIG. 5). With the handle 28 thus positioned, it will be noted that the dog 26 is now disposed in the opposite notch 24 and in engagement with the adjoining ratchet tooth 25.

The user of the tool will now grasp the handle 41 with one hand to steady the tool and with the other hand will shift the handle 28 from the position seen in FIGS. 5 and 8 to the position seen in FIGS. 2 and 7. When the handle 28 reaches the position last mentioned, further movement in this counter-clockwise direction will be prevented by engagement of pin 29 with the abutment 30. In moving in the counter-clockwise direction aforesaid, the dog 26 carried by the collar 22 will compel rotation of the cam member 20 with the collar since the dog is engaged with the cam member's ratchet tooth 25 as previously pointed out.

As cam member 20 is rotated as above described, cam surfaces 20.3 in engagement with respective slide rollers 17, will force slide 13 downwardly against spring 15 to cause the die members 12 and 14 to slit and interlock the overlapped band portions. Final downward movement of the slide causes a knife blade 45 (FIG. 3) to sever the uppermost band portion from the coil C. When the handle 28 reaches the position of FIGS. 2 and 7, cam recesses 20.6 will align with respective slide rollers 17 thus allowing spring 15 to return slide 13 to its uppermost position seen in FIG. 3.

With the band now securely fastened about the article A, handle 36 will be raised to elevate the knurled wheel 40 from the band and the tool will now be slid laterally of the band to withdraw the latter from the housing slot 10.3 and to withdraw the housing base 10.1 from beneath the band whereupon the operations hereinabove described may be repeated to form another band about an article.

I claim:

1. A tool for connecting overlapped portions of a band tensioned about an article, comprising a housing having a longitudinal opening, a first die member carried by a wall at one end of said opening and over which said overlapped band portions are disposed, said housing having a side opening through which said overlapped band portions are passed for die position over said first die member, a slide disposed within said longitudinal opening for rectilinear reciprocation longitudinally thereof, said slide carrying a second die member cooperable with said first die member to form locking tongues in said overlapped band portions, and actuator means for effecting movement of said slide to bring said first and second die members into cooperating, tongue-forming relation, said actuator means being rotatable about the axis of said longitudinal opening but held against axial movement as it is rotated, said actuator means having a helical surface co-acting with a surface of said slide to translate rotation of said actuator means to rectilinear movement of said slide.

2. The construction according to claim 1 and further including resilient means for urging said slide surface and said helical surface to interengaged relation.

3. The construction according to claim 1 wherein a roller is journalled on a shaft carried by said slide, said roller being engageable with said helical surface.

4. A tool for connecting overlapped portions of a band tensioned about an article, comprising a housing having a longitudinal opening, a first die member carried by a wall at one end of said opening and over which said overlapped band portions are disposed, a slide disposed within said longitudinal opening for rectilinear reciprocation longitudinally thereof, said slide carrying a second die member cooperable with said first die member to form locking tongues in said overlapped band portions, and actuator means for effecting movement of said slide to bring said first and second die members into cooperating, tongue-forming relation, said actuator means being rotatable about the axis of said longitudinal opening, but held against axial movement as it is rotated, said actuator means having a pair of similar face cams disposed symmetrically about its rotational axis, and a pair of rollers journalled on a shaft carried by said slide, said roller being disposed on diametrically opposed sides of the axis of reciprocation of said slide and being engageable with respective face cams.

5. The construction according to claim 4 wherein a pair of notches are formed in said actuator means, each notch being between a high and low point of said face cams and adapted to receive a peripheral portion of a respective roller in a non-operative position of said slide.

6. A tool for connecting overlapped portions of a band tensioned about an article, comprising a housing having a longitudinal opening, a first die member carried by a wall at one end of said opening and over which said overlapped band portions are disposed, a slide disposed within said longitudinal opening for rectilinear reciprocation longitudinally thereof, said slide carrying a second die member cooperable with said first die member to form locking tongues in said overlapped band portions, actuator means for effecting movement of said slide to bring said first and second die members into cooperating, tongue-forming relation, said actuator means being rotatable about the axis of said longitudinal opening, said actuator means and said slide having co-acting surfaces operable to translate rotation of said actuator means to rectilinear movement of said slide, and means carried by said housing for tensioning a band about an article.

References Cited

UNITED STATES PATENTS

| | | | |
|---|---|---|---|
| 2,797,714 | 7/1957 | MacChesney | 140—93.2 |
| 3,332,454 | 7/1967 | Lawson | 140—93.2 |
| 3,416,576 | 12/1968 | Britz | 140—93.2 |

CHARLES W. LANHAM, Primary Examiner

R. M. ROGERS, Assistant Examiner

U.S. Cl. X.R.

81—9.1M